UNITED STATES PATENT OFFICE.

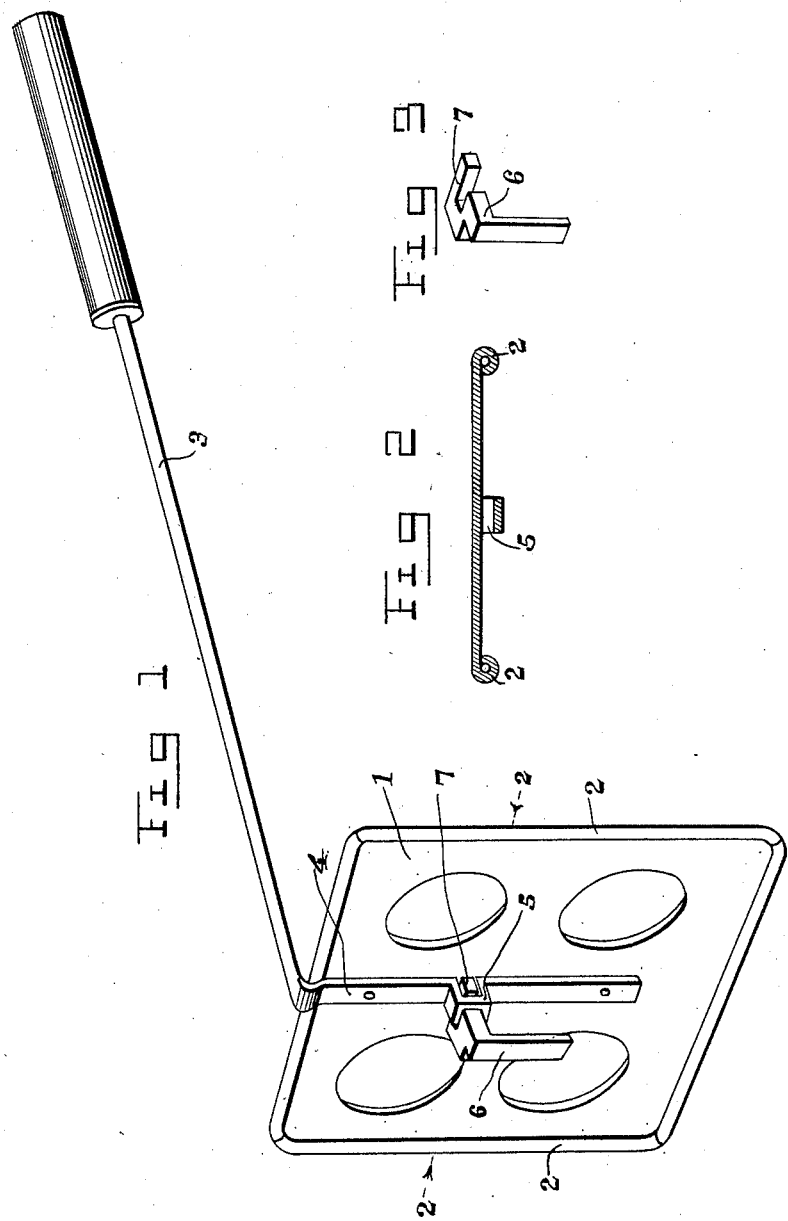
G. CHAPMAN.
FRUIT SPOON.
APPLICATION FILED MAY 5, 1911.
1,004,990.
Patented Oct. 3, 1911.
Inventor
George Chapman
By Victor J. Evans
Attorney

GEORGE CHAPMAN, OF SPENCERVILLE, INDIANA.

FRUIT-SPOON.

1,004,990. Specification of Letters Patent. Patented Oct. 3, 1911.

Application filed May 5, 1911. Serial No. 625,248.

*To all whom it may concern:*

Be it known that I, GEORGE CHAPMAN, a citizen of the United States, residing at Spencerville, in the county of Dekalb and State of Indiana, have invented new and useful Improvements in Fruit-Spoons, of which the following is a specification.

This invention relates to spoons, and primarily to that class of spoons used for stirring fruit or the like while the same is boiling to prevent the burning of the said fruit, and the object of the said invention is to provide a device of this character which is simple in construction, cheap to manufacture and which is provided with means whereby the same may be sustained upon the cooking utensil when not in use.

With the above objects in view, and others which will appear as the nature of the invention progresses, the improvement resides in the novel construction and arrangement of parts hereinafter fully described and claimed.

In the drawings—Figure 1 is a perspective view of a stirring spoon constructed in accordance with the present invention. Fig. 2 is a sectional view upon the line 2—2 of Fig. 1. Fig. 3 is a perspective view of the removable suspension hook.

In the drawings, the numeral 1 designates the bowl of the spoon. In this instance, the bowl 1 is constructed of a rectangular blank of material having its edges bent to form a continuous flange 2.

The numeral 3 designates the handle for the spoon. This handle is formed of a single strip of suitable metal and is bent at right angles to the spoon and preferably has its extremity formed with a wooden end so that the spoon may be operated without danger of the handle burning the hand of the operator.

The bowl 1 is provided with spaced openings, the latter being substantially enlarged, and preferably comprises four in number, two being arranged adjacent the opposite edges of the off-set portion of the handle which is secured to the bowl. The off-set of the handle which may be designated by the numeral 4, is formed with a substantially U-shaped portion designated by the numeral 5. This U-shaped portion is adapted to serve as a pocket for the reception of the angular end of a hook 6. The off-set or angular end of the said hook, designated by the numeral 7, is formed of some resilient material and is preferably beveled, so that when the same is inserted within the U-shaped portion, the pocket or hook will be effectively connected with the bowl of the spoon, and the said hook is adapted to serve as a means whereby the spoon is sustained upon the side of the vessel in which the fruit is being cooked.

Having thus fully described the said invention, what I claim is:—

1. In combination with a stirring spoon having a flattened bowl and being provided upon one of its faces with a substantially U-shaped off-set, of a hook, said hook having an off-set portion constructed of resilient material, and the said off-set portion adapted to be received within the U-shaped off-set of the spoon.

2. The combination with a stirring spoon embodying a flattened bowl having a substantially U-shaped pocket, a hook, said hook comprising a substantially L-shaped member having one of its arms formed with a depression to provide a resilient off-set portion, and the said off-set portion adapted to be received within the pocket of the bowl.

In testimony whereof I affix my signature in presence of two witnesses.

GEORGE CHAPMAN.

Witnesses:
GEO. A. HENDERSON,
M. L. KOCH.

Copies of this patent may be obtained for five cents each, by addressing the "Commissioner of Patents, Washington, D. C."